May 26, 1953 R. W. GILBERT 2,640,089
THERMOCOUPLE COLD-END COMPENSATOR
Filed Jan. 6, 1950
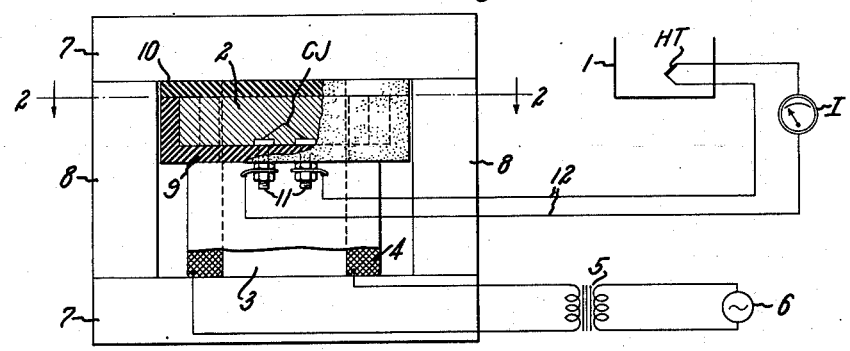
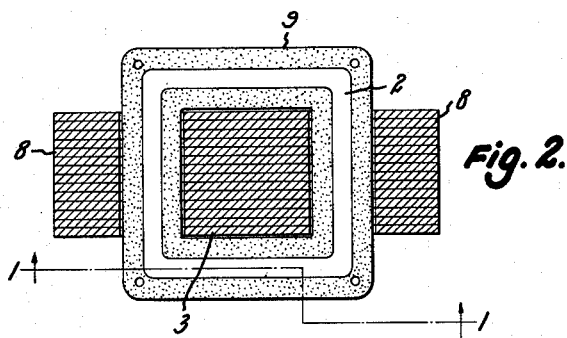
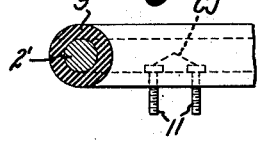
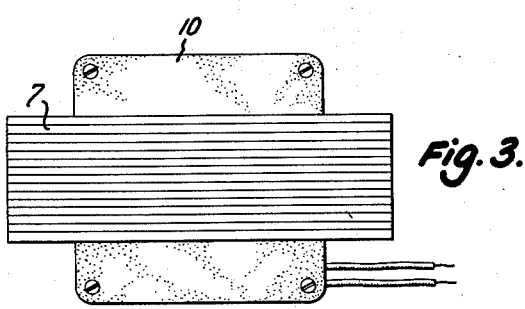
INVENTOR.
Roswell W. Gilbert,
BY
Pierce, Scheffler & Parker,
Attorneys.

Patented May 26, 1953

2,640,089

UNITED STATES PATENT OFFICE 2,640,089

THERMOCOUPLE COLD-END COMPENSATOR

Roswell W. Gilbert, Montclair, N. J., assignor to Weston Electrical Instrument Corporation, Newark, N. J., a corporation of New Jersey Application January 6, 1950, Serial No. 137,110

9 Claims. (Cl. 136—4)

This invention relates to a thermocouple cold-end compensator, and particularly to a device or apparatus for maintaining a thermocouple reference junction at a constant temperature without recourse to relay or temperature-responsive switches in circuits for heating or cooling the thermocouple cold-end or reference junction.

Various arrangements have been proposed and/or employed to compensate for variations in the ambient temperature of the cold-end or reference junction of a thermocouple measuring system but it is apparent that such expedients are unnecessary if the cold-end can be maintained at a constant temperature. The prior proposals for maintaining a constant cold-end temperature have usually been relatively complex constructions with temperature-responsive switch or relay circuits for heating the cold-end of the thermocouple system to a substantially constant temperature.

Objects of the present are to provide a cold-end thermocouple device which is maintained at a substantially constant temperature by a self-regulating heating system which does not include mechanically moving parts, switches or relays. An object is to provide a thermocouple cold-end compensation or reference junction which includes a thermocouple positioned within an alloy which undergoes an abrupt increase in resistivity in passing from a solid to a liquid state, and an electrical circuit of constant potential for heating the alloy; the available power being sufficient to melt the alloy but not sufficient to maintain it in full fluid condition when its resistance is increased upon melting, whereby the alloy is maintained at a constant temperature corresponding to incipient fusion or a semi-solid-liquid state. An object is to provide a thermocouple cold-end or constant temperature device including an alloy ring forming a single-turn secondary winding of a transformer, the primary winding of the transformer being energized from a source of substantially constant potential and so related to the resistance change of the alloy ring, from solid to molten condition, that the alloy ring is maintained at a constant temperature state of incipient fusion.

These and other objects and the advantages of the invention will be apparent from the following specification when taken with the accompanying drawing in which:

Fig. 1 is a schematic view of a thermocouple measuring circuit including, as shown in side elevation, and partly in section on line 1—1 of Fig. 2, a cold-end junction of constant temperature embodying the invention;

Fig. 2 is a horizontal sectional view, on line 2—2 of Fig. 1, of the cold-end junction assembly;

Fig. 3 is a plan view of the cold-end junction assembly; and

Fig. 4 is a fragmentary view, partly in vertical section, of another embodiment of the alloy ring and its housing.

In Fig. 1 of the drawing, the reference character HT identifies a thermocouple located within a compartment or container 1, for example a crucible, oven or furnace whose interior temperature is to be measured by a thermocouple system including a measuring instrument I and a cold junction CJ which is to be maintained at substantially constant temperature. The cold junction CJ is located within an endless band or loop of an alloy 2 which constitutes a single turn secondary winding on the laminated core 3 of a transformer having a primary winding 4 energized through a transformer 5 from a constant potential source 6 of alternating current. The magnetic field structure may include, as illustrated, yokes 7, 7 extending transversely of the core 3 and connected by columns 8, 8. Other designs of the magnetic system are of course possible, for example a field structure of rectangular frame form with the primary and secondary windings on the same or on different legs of the magnetic system.

The alloy 2 is located within a groove in a rectangular frame 9 of insulating material which surrounds the core 3, and it is confined within the groove by a cover plate 10 of insulating material. The terminals 11 which support the cold junction CJ preferably extend through the bottom wall of the frame 9 and are connected in series circuit with the thermocouple HT and the instrument I by leads 12. The molten alloy 2 is poured into the groove of the frame or block 9 and hardens in place with the cold junction CJ positioned at about the transverse center of one side of the alloy loop.

A eutectic alloy is employed as the secondary winding of the transformer, and preferably an alloy of low melting point such as, for example, a ternary eutectic alloy of cadmium, bismuth and tin (Cd=20.2%; Bi=53.9% and Sn=25.9%) having a melting point of 103° C. The eutectic alloys have a definite melting point and the electrical resistance of the alloy increases abruptly as it passes from solid to liquid phase. Other alloys may be employed, for example a quaternary alloy consisting of Bi=49.50%, Cd=10.10%, Pb=27.27% and Sn=13.13%, and having a melting point of 70° C., or a binary alloy of Pb=38% and Sn=62%, having a melting point of 183° C.

The electrical resistance of the eutectic alloy of cadmium-bismuth-tin increases by a factor of about 2 as the alloy passes from solid to liquid state in response to heating by the current induced in the alloy loop 2 by the primary transformer winding 4, the constant potential impressed upon the winding 4 is so selected, with respect to the resistance change, that the current induced in the solid alloy loop 2 is sufficient to melt the alloy, whereas the current induced in the liquid alloy loop 2 is not sufficient to maintain it in molten condition.

This automatic regulation of the power input to the alloy loop or secondary winding of the transformer thus regulates the temperature of the alloy to that of incipient fusion or liquid-solid phase change temperature.

As shown in Fig. 4, the secondary winding may be formed by casting an alloy loop or ring 2' in a mold having appropriate openings for receiving terminals 11 to position the cold junction in the mold cavity, and then molding a plastic shell 9' about the alloy loop to form a housing for the same. In the second molding operation, the terminals 11 serve as supports for locating the alloy loop centrally of the mold cavity.

It is to be understood that the invention is not limited to the particular construction herein illustrated and described, or to a particular alloy of low-melting point which increases in resistance on passing from solid to liquid state, and that various changes may be made in construction or in the alloy composition without departure from the spirit and scope of the invention as set forth in the following claims.

I claim:

1. A method for maintaining a eutectic alloy in the critical boundary between the solid and liquid phase, said method comprising electrically heating the alloy by induction from a substantially constant potential power source of a magnitude adequate to establish a current flow in the solid phase alloy sufficient to melt the same and to establish in the liquid phase alloy a current insufficient to maintain the same in the liquid phase.

2. A method for maintaining a eutectic alloy in the critical boundary between the solid and liquid phase, said method comprising forming the alloy into a closed loop, placing such loop into inductive relationship with a primary winding, and energizing the primary winding with a constant potential having a magnitude such that the induced current flowing in the loop is sufficient to melt the alloy but not sufficient to maintain the alloy in liquid phase.

3. The process of maintaining a thermocouple at constant temperature which comprises placing the thermocouple in thermal contact with an alloy having an electrical resistance which increases upon change of the alloy from solid to liquid phase, and electrically heating said alloy by induction from a power source of substantially constant potential.

4. The process of maintaining a thermocouple at constant temperature which comprises placing the thermocouple in thermal contact with an alloy having an electrical resistance which increases upon change of the alloy from solid to liquid phase, and electrically heating said alloy by induction from a substantially constant potential power source of a magnitude adequate to establish a current in the solid phase alloy sufficient to melt the same and to establish in the liquid phase alloy a current insufficient to maintain the same in liquid phase.

5. A constant temperature device for maintaining a thermocouple junction at a fixed temperature corresponding to the melting point of an alloy which increases in electrical resistance as it passes from solid to liquid phase, said device comprising a transformer having a secondary circuit of an alloy which increases in electrical resistance as it passes from solid to liquid phase, means supporting said thermocouple junction in thermal contact with said alloy, and a primary winding for connection to a substantially constant potential source of a magnitude such that the current induced in the secondary circuit is sufficient to melt the alloy but not sufficient to maintain the alloy in liquid phase, whereby said alloy is maintained in a state of incipient fusion corresponding to a semi-solid-liquid phase condition.

6. A constant temperature device as recited in claim 5, wherein said alloy is a eutectic alloy.

7. A constant temperature device as recited in claim 5, wherein said alloy is a eutectic alloy of cadmium, bismuth and tin.

8. A constant temperature device for maintaining a thermocouple at a fixed temperature; said device comprising a transformer having a primary winding for connection to a power source of substantially constant potential and a closed secondary loop in thermal contact with the thermocouple, said secondary loop comprising an alloy that increases sharply in resistance as the alloy passes from the solid to the liquid phase.

9. A constant temperature device as recited in claim 8, wherein said secondary loop comprises a eutectic alloy of cadmium, bismuth and tin.

ROSWELL W. GILBERT.

References Cited in the file of this patent

UNITED STATES PATENTS

| Number | Name | Date |
|---|---|---|
| 1,432,864 | Johnston | Oct. 24, 1922 |
| 2,025,534 | Sheard et al. | Dec. 24, 1935 |
| 2,228,600 | Hardy | Jan. 14, 1941 |
| 2,235,835 | Goetzel | Mar. 25, 1941 |
| 2,417,923 | Frisk | Mar. 25, 1947 |
| 2,446,283 | Hulsberg | Aug. 3, 1948 |